A. G. HOEGREN.
VEHICLE TIRE.
APPLICATION FILED AUG. 23, 1917.
1,282,692.
Patented Oct. 22, 1918.
2 SHEETS—SHEET 1.
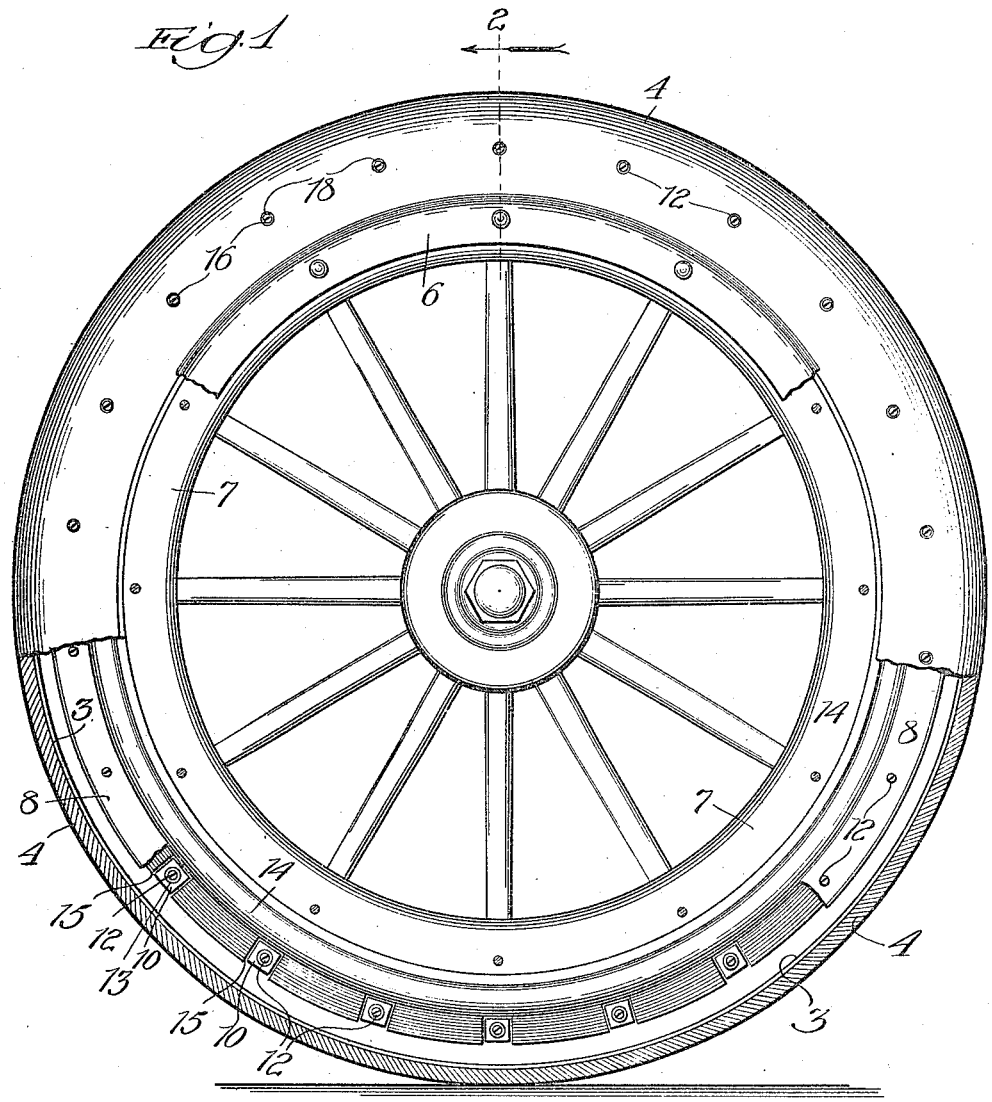

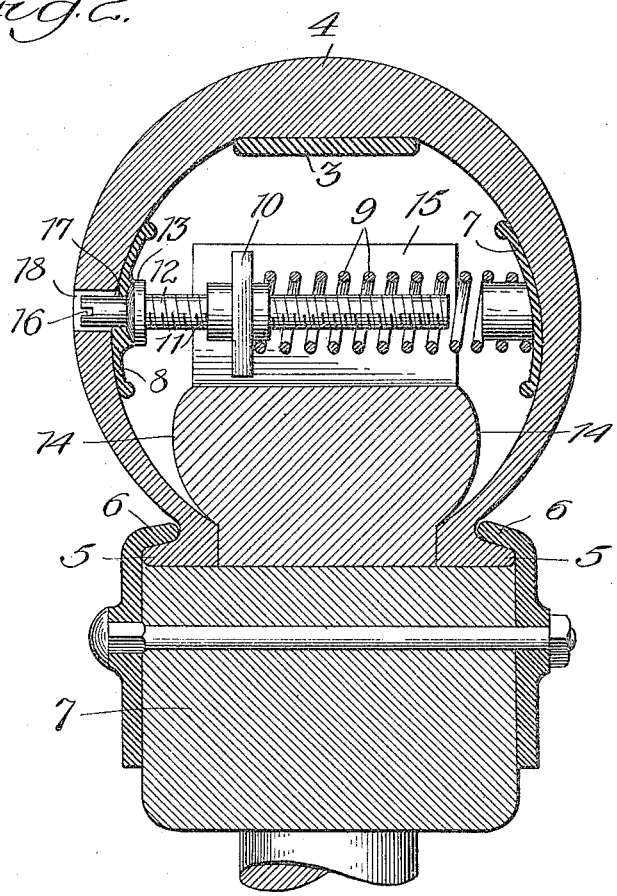

UNITED STATES PATENT OFFICE.

ANDERS G. HOEGREN, OF CHICAGO, ILLINOIS.

VEHICLE-TIRE.

1,282,692.  Specification of Letters Patent. Patented Oct. 22, 1918.

Application filed August 23, 1917. Serial No. 187,732.

*To all whom it may concern:*

Be it known that I, ANDERS G. HOEGREN, a citizen of the United States, residing at Chicago, in the county of Cook and State of Illinois, have invented a new and useful Improvement in Vehicle-Tires, of which the following is a specification.

My object is to provide a new and useful construction of vehicle tire which shall be relatively simple and economical of construction, and which will present substantially the same degree of resiliency and substantially the same easy riding qualities as the pneumatic tire of the common form, and by the use of which the objectionable puncturing or "blow-out" of the tire will be avoided.

Referring to the accompanying drawings, Figure 1 is a face view of a wheel equipped with my improved tire, certain parts thereof being broken away, and Fig. 2, an enlarged section taken at the line 2 on Fig. 1 and viewed in the direction of the arrow.

In constructing a tire according to my invention I provide a circumferential, relatively springy, hoop-section which is of such stiffness as to properly support in a resilient manner, in combination with the structure with which it coöperates, as hereinafter described, the load imposed upon the tire when it is in use on a vehicle. According to what I now regard as the preferred embodiment of my invention, this hoop-section is in the form of a metal ring 3 formed of one or more thicknesses of metal, preferably spring steel, coöperating with a casing-section 4 which, in the construction shown, is of the general cross-sectional shape of the usual outer tire-casing, and is preferably of the same construction, being made of fabric and rubber. The particular casing-section 4 illustrated, has annular beads 5 about its free edge-portions adapted to interlock with rim-flanges 6 bolted to the felly 7 of the wheel.

Coöperating with the casing-section 4 and through the latter with the ring 3 is spring mechanism arranged to exert spreading action against the sides of the casing-section 4 at its inner surface, for placing the circumferential portion of the tire under tension. These means, in accordance with the arrangement shown, comprise rings 7 and 8 which bear against the inner surfaces of the sides of the section 4, under the action of coiled springs 9 arranged in an annular series through the tire and each bearing at one end against the inner side of the ring 7, and at its opposite end against a nut 10 screwing upon the threaded end 11 of a rod 12 carrying a head 13, which bears against the inner face of the ring 8. It will be understood from the foregoing that there is thus provided in the tire an annular series of spring devices arranged at intervals about the tire, which exert spring pressure against the rings 7 and 8, placing the portion 4 under tension and tending to compress the ring 3.

About the periphery of the rim of the wheel I preferably provide an annular member 14 containing transversely disposed recesses 15 in its periphery, through which the respective spring devices just described, extend as shown. The nuts 10 are preferably square and fit within the recesses 15, whereby they are held against rotation upon rotating the threaded rods 12 by a screw-driver applied to their outer notched portions 16 which extend through openings 17 in the ring 8 and into openings 18 in the casing-section 4.

It will be readily understood from the foregoing that by adjusting the threaded rods 12 in the nuts 10 not only may the tension tending to compress the circumferential portion of the tire be rendered uniform throughout its extent, but the degree of this tension may be regulated as desired within certain limits. The placing of the circumferential portion of the tire under the tension as stated operates to cause the tire to perform very much in the same way that the ordinary pneumatic tire does, in the sense that an impact delivered against the tire at one point is distributed quite generally throughout the tire structure, the tendency of the circumferential portion of the tire to move away from the rim of the wheel, in case of such impact operating to draw the sides of the tire structure together, with the result that the springs 9 oppose such action, and by the resiliency thereof effects a highly desirable degree of cushioning. It will be readily understood that by loosening the springs 9 by rotating the threaded rods 12 in one direction, the tire will be rendered more yielding and "softer," and by rotating these rods in the opposite direction the tire may be rendered "harder."

While I have illustrated and described a particular construction embodying my invention, I do not wish to be understood as intending to limit it thereto, as the same may be variously altered and modified without departing from the spirit of my invention, it being my intention to claim my invention as fully and clearly as the prior state of the art will permit.

What I claim as new and desire to secure by Letters Patent, is:

1. A vehicle tire having a circumferentially-extending resilient hoop-portion, spring mechanism arranged to exert pressure crosswise of the tire in an outward direction, and a connecting medium between said hoop-portion and said spring mechanism connecting said hoop-portion and spring mechanism and supporting said hoop-portion from said spring-mechanism, said hoop-portion operating, when pressure is exerted against the tire at its lower portion, to exert pressure against said connecting medium at its opposite portion in a direction for drawing the opposite sides of said connecting medium toward each other against the action of said spring mechanism.

2. A vehicle tire having a circumferentially-extending resilient hoop-portion, a series of spring devices arranged circumferentially of the tire to exert pressure crosswise thereof in an outward direction, and a connecting medium between said hoop-portion and said spring devices connecting said hoop-portion and spring devices and supporting said hoop-portion from said spring-devices, said hoop-portion operating, when pressure is exerted against the tire at its lower portion, to exert pressure against said connecting medium at its opposite portion in a direction for drawing opposite sides of said connecting medium toward each other against the action of said spring devices.

3. A vehicle tire having a circumferentially-extending resilient hoop-portion in the form of a metal band, spring mechanism arranged to exert pressure crosswise of the tire in an outward direction, and a connecting medium between said hoop-portion and said spring mechanism connecting said hoop-portion and spring mechanism and supporting said hoop-portion from said spring mechanism, said hoop-portion operating, when pressure is exerted against the tire at its lower portion, to exert pressure against said connecting medium at its opposite portion in a direction for drawing the opposite sides of said connecting medium toward each other against the action of said spring mechanism.

4. A vehicle tire having a circumferentially-extending resilient hoop-portion, spring mechanism arranged to exert pressure crosswise of the tire in an outward direction, and a flexible connecting medium disposed at opposite sides of the tire between said hoop-portion and said spring mechanism connecting said hoop-portion and spring mechanism and supporting said hoop-portion from said spring-mechanism, said hoop-portion operating, when pressure is exerted against the tire at its lower portion, to exert pressure against said connecting medium at its opposite portion in a direction for drawing the opposite sides of said connecting medium toward each other against the action of said spring mechanism.

5. A vehicle tire having a circumferentially-extending resilient hoop-portion, rings located at opposite sides of said hoop-portion, spring means tending to spread said rings apart, and a connecting medium between said hoop-portion and said rings connecting said hoop-portion and spring means and supporting said hoop-portion from said spring-means, said hoop-portion operating, when pressure is exerted against the tire at its lower portion, to exert pressure against said connecting medium at its opposite portion in a direction for drawing the opposite sides of said connecting medium toward each other against the action of said spring means.

6. A vehicle tire having a circumferentially-extending resilient ring, spring mechanism arranged to exert pressure crosswise of the tire in an outward direction, and a casing section engaging said ring and said spring mechanism, and by which the tire is adapted to be secured to a wheel, said casing operating to connect said ring and spring mechanism and support said ring from said spring mechanism, said ring operating, when pressure is exerted against the tire at its lower portion, to exert pressure against said casing section at its opposite portion in a direction for drawing the opposite sides of said casing section toward each other against the action of said spring mechanism.

7. A vehicle tire formed of a casing, a band of resilient material located at the tread-portion of the tire, said casing being adapted to be secured to a wheel, rings located at the opposite sides of said casing at the interior thereof, and a series of spring devices in said casing and extending crosswise thereof, tending to yieldingly force said rings in a direction away from each other, said band operating, when pressure is exerted against the tire at its lower portion, to exert pressure against said casing at its opposite portion in a direction for drawing the opposite sides of said casing toward each other, against the action of said spring devices.

8. A vehicle tire having a circumferentially-extending resilient hoop-portion, adjustable spring mechanism arranged to exert pressure crosswise of the tire, and a connecting medium between said hoop-portion and said spring mechanism connecting said hoop-portion and spring mechanism and supporting said hoop-portion from said spring mechanism.

9. A vehicle tire formed of a casing, a band of resilient material located at the tread-portion of the tire, said casing being adapted to be secured to a wheel, rings located in said casing at the opposite sides thereof, and a series of adjustable spring devices in said casing and extending crosswise thereof, tending to yieldingly force said rings in a direction away from each other for the purpose set forth.

10. A vehicle tire having a circumferentially-extending resilient hoop-portion, a series of adjustable spring devices arranged to exert pressure crosswise of the tire, and a connecting medium between said hoop-portion and said spring devices connecting said hoop-portion and spring devices and supporting said hoop-portion from said spring-devices.

11. A vehicle tire having a circumferentially-extending resilient hoop-portion, rings spaced apart, a series of adjustable spring devices arranged to exert pressure against said rings, tending to move them in a direction away from each other, and a connecting medium between said hoop-portion and said rings connecting said hoop-portion and spring devices and supporting said hoop-portion from said spring-devices.

12. A vehicle tire having a circumferentially-extending resilient hoop-portion, an annular member, spring devices extending through said annular member crosswise thereof, rings located at the opposite sides of said spring devices, said spring devices comprising threaded members and nuts thereon, said nuts engaging said annular member and operating to lock the nuts against rotation, and a connecting medium between said hoop-portion and said rings connecting said hoop-portion and spring devices and supporting said hoop-portion from said spring-devices, said threaded devices being accessible for operation at the outer side of said connecting medium.

13. A vehicle tire having a circumferentially-extending resilient hoop-portion formed of a band of relatively stiff resilient material having a substantially flat inner periphery, spring mechanism arranged to exert pressure crosswise of the tire in an outward direction, and a connecting medium between said hoop-portion and said spring mechanism connecting said hoop-portion and spring mechanism and supporting said hoop-portion from said spring-mechanism, said hoop-portion operating, when pressure is exerted against the tire at its lower portion, to exert pressure against said connecting medium at its opposite portion in a direction for drawing the opposite sides of said connecting medium toward each other against the action of said spring mechanism.

14. A vehicle tire having a circumferentially-extending resilient hoop-portion, spring mechanism arranged to exert pressure crosswise of the tire in the normal condition of the latter, and a flexible connecting medium disposed at opposite sides of the tire between said hoop-portion and said spring mechanism connecting said hoop-portion and spring mechanism and supporting said hoop-portion from said spring mechanism, said hoop-portion being normally in a state of compression under the action of said spring mechanism and operating, when pressure is exerted against the tire at its lower portion to exert pressure against said connecting medium at its opposite portion in a direction for drawing the opposite sides of said connecting medium toward each other against the action of said spring mechanism.

ANDERS G. HOEGREN.

Copies of this patent may be obtained for five cents each, by addressing the "Commissioner of Patents, Washington, D. C."